UNITED STATES PATENT OFFICE.

DANIEL McCAINE AND DAVID McCAINE, OF ST. PAUL, MINNESOTA.

PROCESS OF TREATING PYROXYLINE, &c.

SPECIFICATION forming part of Letters Patent No. 286,212, dated October 9, 1883.

Application filed June 9, 1883. (No specimens.)

*To all whom it may concern:*

Be it known that we, DANIEL McCAINE and DAVID McCAINE, both citizens of the United States, and both residing at St. Paul, in the county of Ramsey, in the State of Minnesota, have invented certain new and useful Improvements in a Process of Treating Pyroxyline and Pyroxyline Compounds, of which the following specification is a full, clear, and exact description.

Our invention is an improvement on the process of treating pyroxyline described and claimed in Letters Patent No. 217,232, issued to William McCaine, July 8, 1879. By that patent, after the pyroxyline has been reduced to a spongy or jelly-like consistency, it is completely dissolved by adding spirits of turpentine thereto, whereby a perfectly solid homogeneous product is produced entirely free from air-bubbles or fixed air.

The object of our invention is to find some substitute for spirits of turpentine which will be equally efficacious in freeing the pyroxyline from air-bubbles, and in making a homogeneous product by the cold method, and give equal body and firmness thereto as the spirits of turpentine, and at much less expense, the spirits of turpentine being expensive for this manufacture. We have found by experiment that benzine or any of the light mineral oils is equally efficacious, for bringing pyroxyline to a homogeneous mass and free from air-bubbles, to spirits of turpentine; but these light mineral oils lack the resinous body which is found in spirits of turpentine, and which is valuable to the pyroxyline product. We therefore, as further perfecting the invention, add a sufficient quantity of some suitable resinous substance to give about the same proportion thereof to the product as is produced by the spirits of turpentine by the aforesaid Letters Patent.

We first dissolve with pyroxylic spirits, alcohol, sulphuric ether, or other suitable fluid in which resin or the other vegetable resinous substances will dissolve, a quantity of resin, gum-copal, gum-shellac, or other suitable vegetable resins in the proportion of about two (2) to six (6) ounces of the resin to each gallon of any suitable solvent of pyroxyline. Then add to this compound a sufficient quantity of gun-cotton or pyroxyline to produce a sponge-like mass of about the consistency of jelly. If pigments or coloring-matter, or both, are to be introduced, they are added at this stage of the process, and time given them to thoroughly combine with the pyroxyline. We then introduce benzine, gasoline, or other equivalent substance of about equal bulk with the mass of the jelly-like compound, or a sufficient quantity to reduce the mass to a liquid or semi-liquid condition when thorougly stirred. The compound is then poured into vessels or molds formed of porous material, when the surplus liquid will drain off, leaving the pyroxyline pigments, and other solid matter in a plastic homogeneous mass, free from air-bubbles or other defects. The compound is then cut up into proper form for drying quickly, so that when sufficiently dried it may be pressed into any required form. The pigments or coloring-matter, or both, and the resinous substances in the proper proportion, may be ground up together and then added to the solvent, and the remaining steps of the process conducted as before. Another method of introducing the resinous substances is to first reduce the required quantity of pyroxyline by alcohol, sulphuric ether, or other suitable solvent or solvents to a jelly-like or plastic condition, (and add the pigments or coloring-matter, or both, if they are required.) We then take benzine, gasoline, naphtha, or other suitable product of carbon or schale oils in the proportion of about one quart to each pound of the pyroxyline in the dry state before it is reduced to the plastic condition above mentioned. Into this quantity of benzine, gasoline, or other fluid used we dissolve a small quantity of the resin, gum-copal, gum-shellac, or other suitable vegetable resins, before mentioned, in the proportion of about three (3) to eight (8) ounces to each gallon of the dissolving-fluid used. This solution of benzine or other fluid and the resinous substance is then added to the mass of pyroxyline, and the whole thoroughly mixed or stirred until it becomes in a fluid or semi-fluid state or condition. The compound is then poured into porous vessels or molds and treated as before described. After the pyroxyline has been poured into the porous molds pressure may be used to expel the surplus fluids, but it is not a necessity, the only advantage gained being in the saving of time. All the ingredients are used in a cold state or at their natural temperatures, and no heat is used until the compound is to be pressed into the required forms for manufacturing purposes.

By this process the resinous substance used thoroughly impregnates the whole mass of the pyroxyline compounds, and imparts a greater density, elasticity, and susceptibility to polish than can be obtained by any other process with which we are acquainted, and materially lessens the cost. The presence of the resin also prevents the goods manufactured from the pyroxyline from cracking, shrinking, or swelling, or otherwise changing their shapes by extreme degrees of heat or cold after being properly seasoned.

In producing the pyroxyline for the manufacturing of some of the more rigid articles the resinous substances may be added to the pyroxyline in its fluid or semi-fluid state, and the treatment by the naphtha or benzine or its quivalents dispensed with.

Having described our invention and set forth its merits, what we claim is—

1. The process of treating pyroxyline or pyroxyline compounds, which consists in, first, dissolving the pyroxyline in a suitable solvent, and then treating the same with benzine or equivalent light mineral oil, substantially as and for the purpose herein specified.

2. The process of treating pyroxyline or pyroxyline compounds, which consists in, first, dissolving the pyroxyline in a suitable solvent, and then treating the same with benzine or equivalent light mineral oil and resin, or a resinous substance, substantially as and for the purpose herein specified.

In testimony whereof we have hereunto set our hands in presence of two subscribing witnesses.

DANIEL McCAINE.
DAVID McCAINE.

Witnesses:
C. N. WOODWARD,
LOUIS FEESER, Sr.